United States Patent Office 3,669,708
Patented June 13, 1972

3,669,708
PROCESS FOR THE MANUFACTURE OF FLEXIBLE SURGICAL AND ORTHOPEDIC BANDAGE MATERIALS
Willy Ernst Reber, Rennweg 73; and Henry Nigst, Kornhausgasse 2, both of Basel, Switzerland; Josef Haas, Im Meiriacher 71, Binningen, Switzerland; and Hans Batzer, Rainweg 7; and Paul Zuppinger, Bodenweg 12, both of Arlesheim, Switzerland
No Drawing. Continuation-in-part of application Ser. No. 438,732, Mar. 10, 1965. This application Mar. 11, 1970, Ser. No. 18,746
Claims priority, application Switzerland, Mar. 20, 1964, 3,619/64
Int. Cl. A61l 15/00; B44d 1/092, 1/094
U.S. Cl. 117—33                        3 Claims

ABSTRACT OF THE DISCLOSURE

A process for the manufacture of flexible surgical and orthopedic bandage materials essentially comprising 1,2-epoxy resin impregnated glass fibre fabric having a high filler content and which bandage materials can be shaped and hardened at physiologically acceptable temperature and within surgically acceptable time interval to mechanically stiff surgical and orthopedic permanent supporting dressings, wherein in a first stage a flat structural material which is porous or suitable for use as bandage for patients is impregnated with a liquid, curable 1,2-epoxy resin-curing agent composition and then in a second stage the wet, tacky surface is sprinkled with a sufficient amount of a finely powdered filler, and any excess of filler is removed mechanically, to form a dry-, non-tacky, smooth surface on the resin impregnated flat material. The so-obtained flexible bandage being adapted for conversion into mechanically stiff, hardened surgical and orthopedic permanent supporting dressing on the body of a patient.

CROSS REFERENCES TO RELATED APPLICATIONS

This application is a continuation-in-part application of our copending application Ser. No. 438,732, filed Mar. 10, 1965, now abandoned.

It is known that resin impregnated flat structural materials, such as laminates, can be manufactured by impregnating flat materials consisting of or containing inorganic or organic, natural or synthetic fibres, more especially glass fibres or glass threads, with mixtures that are preferably free from solvents, are liquid at the working temperature, and consist of compounds that can be cured by polymerization or polyaddition and of curing compounds, whereupon the impregnated material is cured either in the form of a single layer or of a sandwich or in the form of a laminate containing further interlayers or covering layers, if desired while at the same time shaping the material and, if necessary, under pressure. As suitable relevant curable compounds there have been proposed above all unsaturated polyester resins or compounds whose molecule contains on an average more than one epoxide group. For curing the polymerizable compounds there have been used peroxides, more especially organic peroxides, optionally in combination with known metal driers, for example cobalt naphthenate or octoate, while the epoxy resins have been cured with the usual curing agents, more especially with polyamines. The flat materials used were woven, braided or knitted fabrics, fibre mats or fleeces or similar fibrous materials.

Flat materials of the kind referred to have also been impregnated with liquid, curable resin mixtures containing fillers and then made up in known manner into cured laminates. However, according to this process only a limited amount of filler can be incorporated with the flat material because it must be ensured that the wetting and penetrating power of the curable resin mixtures is not impaired by excessive viscosity or excessive thickening.

The present invention relates to a process for the manufacture of resin impregnated flat structural materials having a high filler content, which are suitable for shaping in the form of single layers or multi-ply structures, without application of pressure and at room temperature to form cured laminates, wherein in a first stage a flat structural material which is porous or suitable for impregnation is impregnated with a liquid, curable resin composition and then in a second stage the wet, tacky surface is sprinkled with a sufficient amount of a finely powdered filler, and any excess of filler is removed mechanically, to form a dry-, non-tacky, smooth surface on the resin impregnated flat material.

Resin impregnated flat materials having a high filler content obtained by the present process can be shaped in known manner, in the form of single layers or of multi-ply structures, without application of pressure and at room temperature to form cured laminates containing a multiple of that amount of filler which could be incorportead by the hitherto known process in the flat material or in the laminate.

It has been found that resin impregnated laminates having a high filler content, such as are obtained from flat materials manufactured by the present process, offer considerable advantages for certain uses, depending on the kind of the flat materials used in the manufacture and on the kind of resin mixture, curing agent and shaping conditions used. For example when coarse-pored glass fibre fabrics, which have been impregnated with a curable epoxy resin mixture and sprinkled with alumina trihydrate on both sides, are shaped without or substantially without application of pressure, the final product is surprisingly a porous laminate which can be used with advantage as supporting elements for use in surgery and orthopedy.

The present invention provides a process for the manufacture of flexible surgical and orthopedic bandage materials essentially comprising 1,2-epoxy resin impregnated glass fibre fabric having a high filler content and which bandage materials can be shaped and hardened at physiologically acceptable temperature and within surgically acceptable time interval to mechanically stiff surgical and orthopedic permanent supporting dressings which process comprises impregnating in a first step a glass fibre fabric suitable for use as bandage for patients to be treated, with a resin composition liquid at room temperature and consisting of a curable 1,2-epoxy resin and a curing agent therefore, to form a wet, tacky surface on the glass fiber fabric, said resin composition being curable at physiologically acceptable temperatures, and sprinkling in a second step the wet, tacky surface of the resin impregnated glass fibre fabric with a finely pulverulent inorganic filler selected from the group consisting of alumina and alumina trihydrate in amount at least sufficient to form a dry, non-tacky, smooth surface on said resin impregnated glass fibre fabric, and removing any excess filler, the so-obtained flexible bandage being adapted for conversion into mechanically stiff, hardened surgical and orthopedic permanent supporting dressing on the body of a patient at a physiologically acceptable curing temperature and without application of physiologically unacceptable pressure.

As porous flat materials that can be impregnated there may be used in the present process woven, braided for knitted fabrics, mats, fleeces or similar flat materials made from organic or inorganic, natural or synthetic fibres or filaments, such as animal or vegetable fibres or filaments, from polyamide fibres or similar synthetic fibres, from metal threads or preferably from glass fibres or glass threads or so-called rovings.

Suitable liquid to pasty compounds are epoxy compounds with an epoxy equivalency greater than one such as are obtained in known manner from polyhydric alcohols or polyhydric phenols, especially from 4,4'-dihydroxydiphenyldimethylmethane (bisphenol A) and epichlorohydrin in an alkaline medium, or by epoxidation of unsaturated aliphatic or cycloaliphatic compounds. As is known, epoxy resins can be cured by room temperature with basic curing agents e.g. aliphatic or cycloaliphatic polyamines, also polyamides of dimerized unsaturated fatty acids; further with boron fluoride complexes and similar compounds. In selecting the compound to be used as curing agent it must be borne in mind that its mixture with the compound to be cured must be liquid at room temperature, or at least at the impregnating and sprinkling temperature, and that in each case a curing agent is chosen that is inert towards the filler to be used.

Suitable fillers are quite generally all pulverulent organic or especially inorganic substances that are inert towards the resin mixture used, such as quartz meal, mica powder, slate powder, titanium dioxide powder, bolus alba, burnt clay, alumina, alumina trihydrate, silica marketed under the trademark Aerosil, metal powders such as aluminium or copper powder; furthermore lampblack, cellulose powder, wood meal or other powdered organic substances. It will be readily understood that the amount of filler that can be incorporated with the flat material or laminate depends on the properties of the filler, such as its specific gravity, its bulk weight or bulk volume or on its general rheological properties. The expert will have no difficulty in finding the best suited filler for each concrete case.

Parts and percentages in the following example are by weight.

Example

Surgical fixtures or orthopedic supporting bandages, e.g. for fixing a fracture, are manufactured in the following way:

A porous glass fabric of the Scheindreher type (600 g. per square meter), makers Fibres de Verre, Lausanne (Switzerland), was impregnated on both sides with a resin+curing agent mixture consisting of 33.0 parts by weight of the epoxy resin obtained by condensing epichlorohydrin with bisphenol A in the presence of NaOH, having an epoxide equivalence of 5.2 per kg., 10.25 parts by weight of dibutylphthalate, 16.25 parts by weight of bolus alba, 3.0 parts by weight of titanium dioxide and 3.3 parts by weight of the boron trifluoride complex obtained by injecting 0.625 part of gaseous boron trifluoride into 5 parts of tetrahydropyran, and then copiously sprinkled with alumina trihydrate on both sides. When the excess filler had been shaken off, a dry, open-pored laminate was obtained.

The above laminate can be folded with ease about the fractured limb to form within about 30 minutes at 36 to 37° C., without application of pressure, a rigid, mechanically very strong, porous supporting bandage. For 43 g. of glass fabric (300 x 480 x 0.6 mm.) there were used 31 g. of resin+curing agent mixture and 32 g. of alumina trihydrate; the resin bonded fabric absorbed about 26 g. of the latter.

Since it is surprisingly easy to increase in this way the filler content to the degree mentioned above, without impairing the above-mentioned good properties, there results the further advantage that very little heat is liberated on curing and that there is no risk of a temperature of 43° C. being exceeded. When the filler content is lower, as it is obtained for instance by the hitherto used laminating method, that is to say when the filler is first incorporated with the resin+curing agent mixture in an amount that ensures that the mixture formed is still just brushable, the curing temperature may easily exceed 43° C., and this may lead to unpleasant burns, especially when, as in the present case, curing is complete within a short time.

If it is desired to interpose a separating layer or a cushioning layer between the skin and the supporting bandage, it has proved particularly advantageous to use for this purpose a foamed polyvinyl chloride product which has closed cells and is partially perforated, as marketed under the trade name Airex.

What is claimed is:

1. A process for the manufacture of flexible surgical and orthopedic bandage materials essentially comprising 1,2-epoxy resin impregnated glass fibre fabric having a high filler content and which bandage materials can be shaped and hardened as physiologically acceptable temperature and within surgically acceptable time interval to mechanically stiff surgical and orthopedic permanent supporting dressings which process comprises impregnating in a first step a glass fibre fabric suitable for use as bandage for patients to be treated, with a resin composition liquid at room temperature and consisting of a curable 1,2-epoxy resin and curing agent therefore, to form a wet, tacky surface on the glass fibre fabric, said resin composition being curable at physiologically acceptable temperature, and sprinkling in a second step the wet, tacky surface of the resin impregnated glass fibre fabric with a finely pulverulent inorganic filler selected from the group consisting of alumina and alumina trihydrate in amount at least sufficient to form a dry, nontacky, smooth surface on said resin impregnated glass fibre fabric, and removing any excess filler, the so-obtained flexible bandage being adapted for conversion into mechanically stiff, porous hardened surgical and orthopedic permanent supporting dressing on the body of a patient at a physiologically acceptable curing temperature and without application of physiologically unacceptable pressure.

2. A process as claimed in claim 1, wherein the liquid, curable resin composition contains a liquid 1,2-epoxy resin prepared by condensation of 4,4'-dihydroxydiphenyldimethylmethane with epichlorohydrin in alkaline medium, and a curing agent for epoxy resins.

3. A process as claimed in claim 1, wherein the fabric used is a porous glass fibre fabric, the filler used is alumina trihydrate and the curing agent used is boron trifluoride complex.

References Cited

UNITED STATES PATENTS

| 2,674,648 | 4/1954 | Nicodemus | 117—161 |
|---|---|---|---|
| 2,956,613 | 10/1960 | Edelman et al. | 117—126 |
| 3,293,322 | 12/1966 | Pennino | 260—37 Ep |
| 3,360,391 | 12/1967 | Richtzenhain et al. | 117—26 |

FOREIGN PATENTS

| 834,063 | 5/1960 | Great Britain | 128—90 |
|---|---|---|---|
| 879,666 | 10/1961 | Great Britain | 128—89 |
| 1,165,810 | 3/1964 | Germany | 128—90 |
| 247,330 | 11/1960 | Australia | 117—126 GE |

OTHER REFERENCES

Brickman, Leo, "Plastics and Polymers in Surgical Dressings and Bandages," American Chem. Soc. Div. of Organic Coatings and Plastics Chem., Proceedings, vol. 24, No. 2, 1964, pp. 243–248.

WILLIAM D. MARTIN, Primary Examiner

R. M. SPEER, Assistant Examiner

U.S. Cl. X.R.

117—26, 29, 76T, 126 GE; 128—89, 90

PO-1050
(5/69)

UNITED STATES PATENT OFFICE
CERTIFICATE OF CORRECTION

CASE 5441/E/CIP

Patent No. 3,669,708          Dated June 13, 1972

Inventor(s) WILLY ERNST REBER ET AL

It is certified that error appears in the above-identified patent and that said Letters Patent are hereby corrected as shown below:

Column 1, line 9, after "Switzerland" insert

--- assignors to CIBA-GEIGY AG, Basel, Switzerland ---.

Signed and sealed this 13th day of March 1973.

(SEAL)
Attest:

EDWARD M. FLETCHER, JR.
Attesting Officer

ROBERT GOTTSCHALK
Commissioner of Patents